(12) United States Patent
St. Germain et al.

(10) Patent No.: US 9,589,444 B1
(45) Date of Patent: Mar. 7, 2017

(54) ELECTRONIC ROUNDSLING INSPECTION, LOAD MONITORING AND WARNING SYSTEM

(71) Applicant: Slingmax Technologies LLC, Wilmington, DE (US)

(72) Inventors: Scott St. Germain, Aston, PA (US); Gregory D'Elia, Aston, PA (US); Sedar Uckun, Aston, PA (US)

(73) Assignee: Slingmax Technologies LLC, Wilmington, DE (US)

( * ) Notice: Subject to any disclaimer, the term of this patent is extended or adjusted under 35 U.S.C. 154(b) by 0 days.

(21) Appl. No.: 15/208,271

(22) Filed: Jul. 12, 2016

Related U.S. Application Data

(60) Provisional application No. 62/278,109, filed on Jan. 13, 2016, provisional application No. 62/241,401, filed on Oct. 14, 2015.

(51) Int. Cl.

| | | |
|---|---|---|
| *G08B 1/08* | (2006.01) | |
| *G08B 21/18* | (2006.01) | |
| *H04W 4/00* | (2009.01) | |
| *G06K 19/077* | (2006.01) | |
| *G08B 31/00* | (2006.01) | |
| *B66C 1/12* | (2006.01) | |

(52) U.S. Cl.
CPC .............. *G08B 21/185* (2013.01); *B66C 1/12* (2013.01); *G06K 19/07798* (2013.01); *G08B 31/00* (2013.01); *H04W 4/005* (2013.01)

(58) Field of Classification Search
CPC ........... G08B 21/18; G66C 1/12; D07B 1/145
USPC ............... 340/539.11, 665, 506, 677; 294/74
See application file for complete search history.

(56) References Cited

U.S. PATENT DOCUMENTS

| | | | | |
|---|---|---|---|---|
| 5,727,833 | A * | 3/1998 | Coe ........................... | B66C 1/12 294/74 |
| 7,331,071 | B1 * | 2/2008 | Cherubini .............. | A47C 31/00 340/573.1 |
| 7,658,423 | B1 * | 2/2010 | Carmichael ............... | B66C 1/12 294/74 |
| 2008/0061572 | A1 * | 3/2008 | Harada ..................... | B66C 1/12 294/74 |
| 2009/0143923 | A1 * | 6/2009 | Breed .................... | G08G 1/205 701/1 |
| 2012/0255349 | A1 * | 10/2012 | Pop ..................... | B60C 23/0413 73/146.5 |
| 2015/0316921 | A1 * | 11/2015 | Atherton ............ | G05B 19/4065 700/114 |

* cited by examiner

*Primary Examiner* — Phung Nguyen
(74) *Attorney, Agent, or Firm* — Panitch Schwarze Belisario & Nadel LLP

(57) ABSTRACT

An electronic overload inspection and warning system for a roundsling having a strand positioned within a plurality of core strands and a cover. The system includes a wireless sensor system mountable to the roundsling. The wireless sensor system includes at least one strain gauge electrically connected with a wireless transmitter. The strain gauge measures strain on the strand. The system also includes a wireless base station and a carrier element. The wireless base station includes a wireless receiver configured to wirelessly communicate with multiple deployed wireless sensor systems. The carrier element is secured to the strand. The strain gauge is secured to the carrier element.

22 Claims, 11 Drawing Sheets

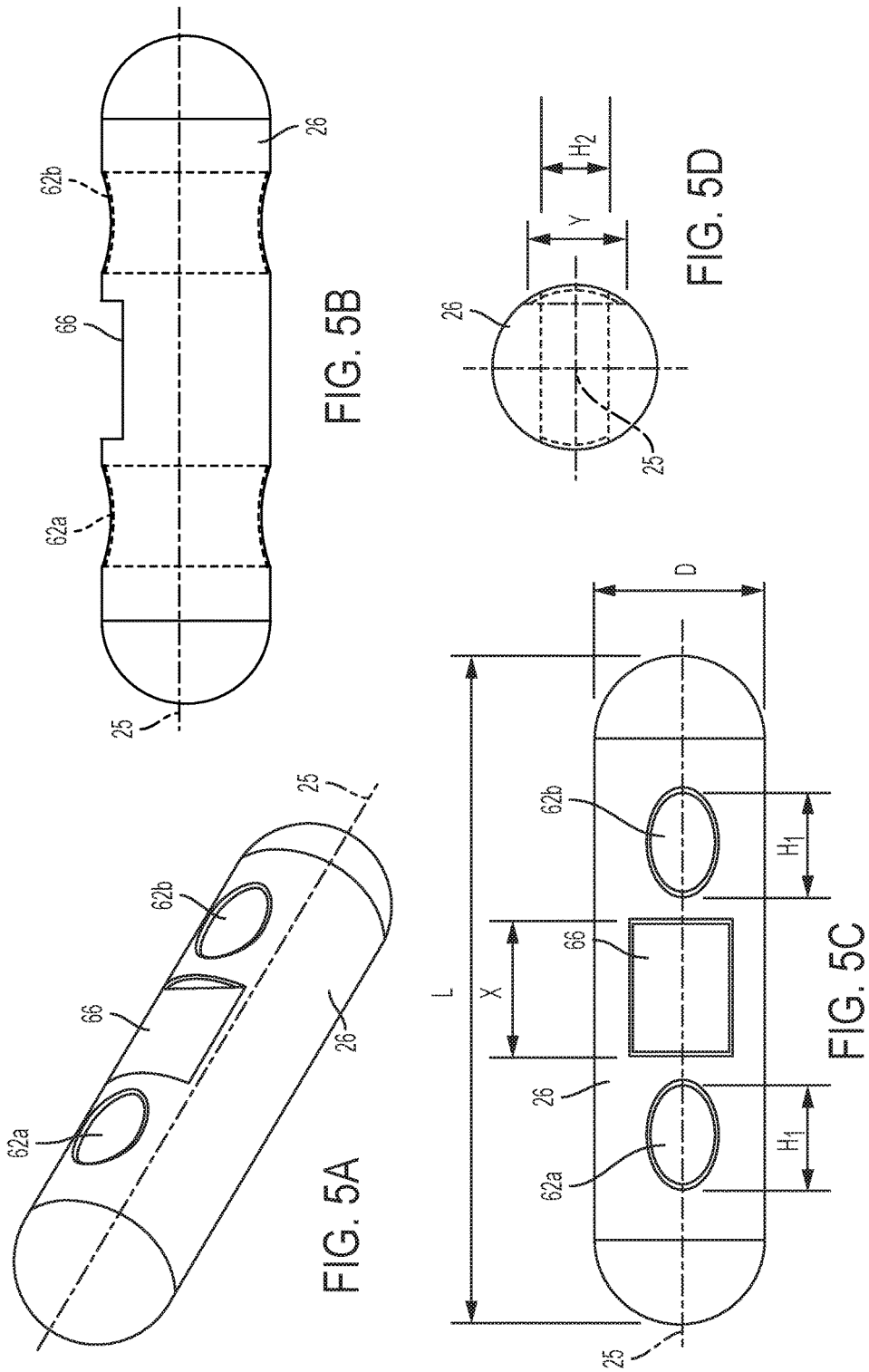

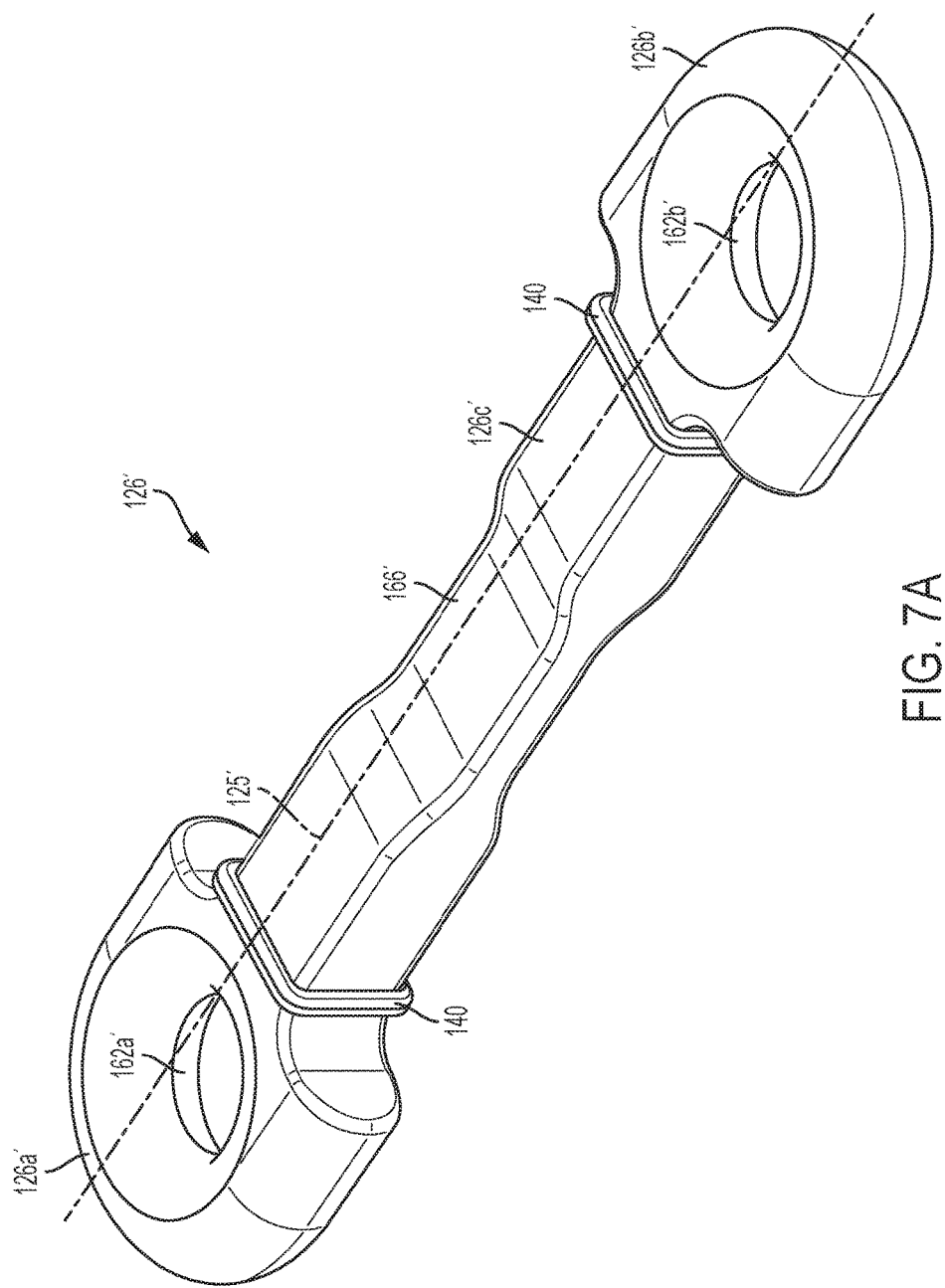

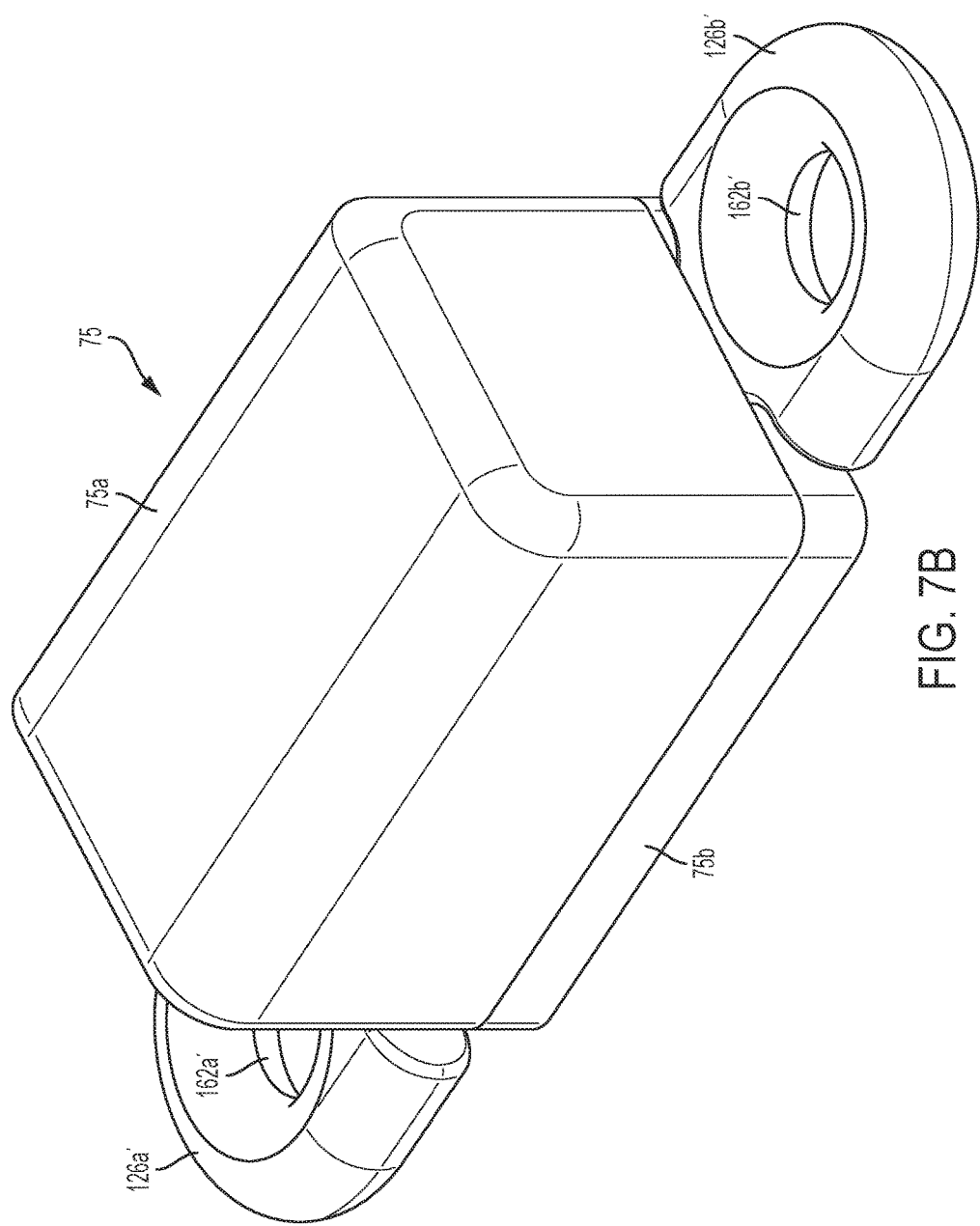

ELECTRONIC ROUNDSLING INSPECTION, LOAD MONITORING AND WARNING SYSTEM

CROSS-REFERENCE TO RELATED APPLICATIONS

The present application claims the benefit of U.S. Provisional Patent Application No. 62/241,401, filed on Oct. 14, 2015 and titled "Electronic Roundsling Inspection, Load Monitoring and Warning System," and U.S. Provisional Patent Application No. 62/278,109, filed on Jan. 13, 2016 and titled "Electronic Roundsling Inspection, Load Monitoring and Warning System," the entire contents of which are incorporated herein by reference in their entirety.

BACKGROUND OF THE INVENTION

Preferred embodiments of the present invention relate generally to a system and method for warning when a roundsling is loaded beyond its rated capacity, load limit or is potentially nearing failure. Preferred embodiments of the invention also relate to a system and method for monitoring loads applied to a roundsling in real time.

Industrial slings are typically constructed of metals or synthetic materials. Wire rope slings are commonly made of a plurality of metal strands twisted together and secured by large metal sleeves or collars. Synthetic slings are usually comprised of a lifting core made of strands of synthetic fiber and an outer cover that protects the core. The strands of the core are typically inserted in a generally parallel orientation to the other strands within the core, but may also be twisted as they are inserted into the cover, as is described in Slingmax's U.S. Pat. No. 7,926,859, which is incorporated herein by reference in its entirety. Synthetic slings provide weight, strength and other advantages over wire rope slings. One popular design of synthetic slings is a roundsling in which the lifting core forms a continuous loop and the sling has a circular or oval-shaped appearance.

Modern industrial slings may experience failure and loss of a load caused by the sling breaking or failing, for example, because the sling is fatigued, over-stretched or over-loaded during a current or previous use. When subjected to an overload condition in excess of its rated capacity, a roundsling may be permanently damaged and/or deformed if the load stretches the fibers of the load bearing core material beyond their rated strength. When a synthetic fiber sling is overloaded beyond its tensile strength or weight-lifting capacity, it is considered to be damaged and may never return to its normal strength and load bearing capacity. Detection of such overloading conditions can be difficult to visually or otherwise inspect or determine during field use.

Slings are generally provided with specified load capacity (rated capacity), which is a load over which the particular sling should not be loaded. The rated capacity also provides guidance to users regarding the rated or safe lifting capacity of the sling. Nevertheless, this capacity is sometimes exceeded, either accidentally, by unexpected shock loading, or by users engaging in unsafe shortcuts during rigging and use of the sling. In addition, as the sling is used, it may become subject to abrasion, cuts or other environmental degradation to its fibers, which also weaken the working load limit, actual capacity and tensile strength of the sling and potentially negatively impact the rated capacity. Environmental factors that may weaken the working load limit, capacity and tensile strength of the sling include poor maintenance, ultraviolet radiation exposure, bending, kinks, knots, wear, fatigue, retention of water, temperature, and other related environmental factors. Individually or cumulatively, such conditions may lead to unexpected failure of the sling during use. It is, therefore, desirable to measure and record the loads that are applied to a sling every time the sling is used for lifting.

There are no methods known in the art for continuous, direct measurement of loads on either a wire rope or synthetic sling during industrial or field-use settings. Current methods rely on detecting only an overload condition or indirect measurements of loads, e.g., using load cells at attachment points or related measurement techniques. Depending on the rigging configuration, these indirect measurements may provide misleading information on direct loads applied to each independent sling that is used in a lifting job.

Often, over-load, fatigue, or damage to the sling materials are not readily apparent as the result of visual inspection, particularly given the large size or length of a particular sling, or because the load-bearing core is hidden inside the outer cover. If a roundsling is fatigued or structurally changed, the sling may no longer be able to lift a load according to its maximum rated load capacity or its load limit. These fatigue or structurally weakened conditions may become a threat to operators and riggers using the damaged sling.

A commercially available roundsling may include a pre-failure indicator. An example of such a pre-failure warning indicator is described in U.S. Pat. No. 7,661,737, the contents of which are incorporated herein by reference in their entirety. Such pre-failure indicators are designed to produce a visible sign of overload when the sling is overloaded beyond its rated capacity, but below its breaking strength. These pre-failure warning indicators do not determine the exact load imparted on the sling during loading, but only provide an indication that the sling was loaded beyond its rated capacity. In addition, depending on the rigging configuration and location of the sling or pre-failure indicator on the sling, it may be difficult for operators or riggers to visually identify the activation of the pre-failure indicators during the lifting operation. The inability to immediately identify the overloading condition might result in unsafe lifting operations continuing until the riggers inspect the roundsling after the lifting operation is completed.

There is a need in the art of rigging and sling inspection for consistent and reliable sling pre-failure indication. In addition, there is a need to identify structurally sound slings that have useful operational life even after their initially predicted lifetime. There is also a need to provide for structural health monitoring of the sling by monitoring the loads applied to the sling and the environmental exposure of the sling during operation to determine the state of the system health during the useful life or to more accurately predict the useful life of the sling. Finally, there is a need to measure loads that are imparted on slings in real time during lifting operations and to record and store loading information for individual slings over their lifetime to provide accurate and predictable useful life predictions for the slings. An advanced warning that a sling is near its breaking point provides operators of the sling with an opportunity to take corrective action. In addition, advanced warning of the structural capacity of the sling by monitoring and/or predicting the structural health of the sling can extend the lifetime of the sling, thereby reducing the necessity for costly and unnecessary replacement of the sling. Further, knowing the lifetime loading, environmental factors and overload history of a particular sling allows riggers to identify and select the safest and most appropriate equipment for each rigging task.

BRIEF DESCRIPTION OF THE DRAWINGS

The foregoing summary, as well as the following detailed description of the invention, will be better understood when read in conjunction with the appended drawings. For the purpose of illustrating the preferred invention, there is shown in the drawings an embodiment which is presently preferred. It should be understood, however, that the invention is not limited to the precise arrangements and instrumentalities shown. In the drawings:

FIG. 5A is a top perspective view of a second preferred carrier plate of the preferred electronic overload inspection and warning system of FIG. 1;

FIG. 5B is a side elevational view of the carrier plate of FIG. 5A;

FIG. 5C is a top plan view of the carrier plate of FIG. 5A;

FIG. 5D is a front elevational view of the carrier plate of FIG. 5A;

FIG. 7A is a top perspective view of a fourth preferred carrier plate of the preferred electronic overload inspection and warning system of FIG. 1;

FIG. 7B is a top perspective view of the carrier plate of FIG. 7A partially enclosed in a housing in accordance with a preferred embodiment of the present invention;

DESCRIPTION OF THE DISCLOSURE

Figure 1:
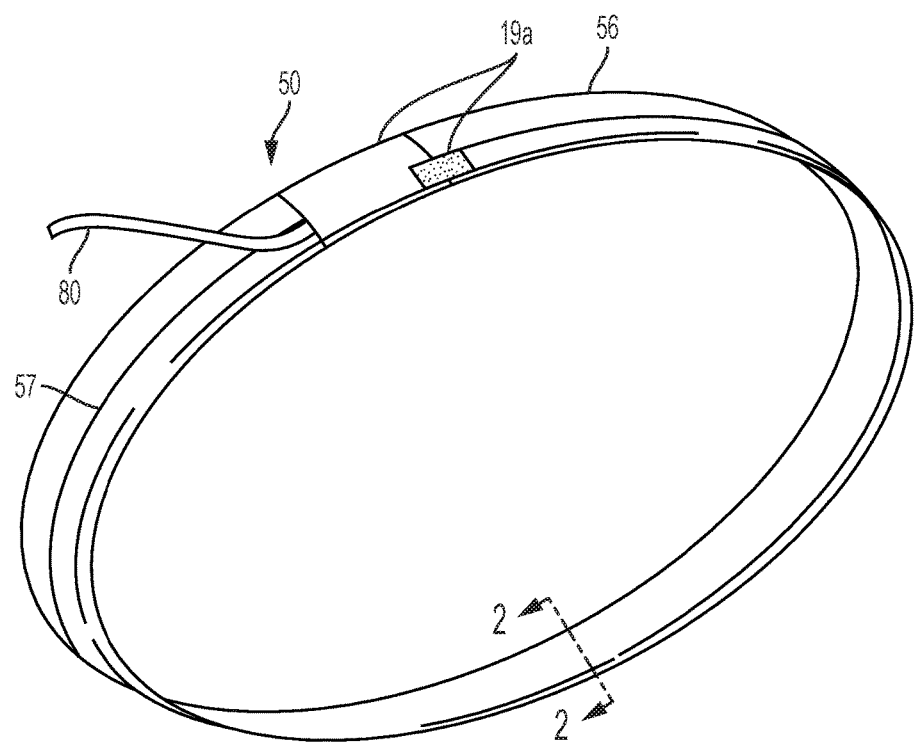
FIG. 1 is a top perspective view of an exemplary roundsling for use with the electronic overload inspection and warning system in accordance with a preferred embodiment of the present invention.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the roundsling and related components of the preferred systems, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-4 an electronic overload inspection and warning system, generally designated 10, for roundslings 50 in accordance with a preferred embodiment of the present invention.

The roundsling 50 preferably includes a load-bearing core 52 and a cover 56 that surrounds and protects the load-bearing core 52. The core 52 may be comprised of a plurality of strands 54 (FIG. 2) that may be fabricated from any suitable material, including metal or synthetic polymers or composite materials. The core 52 may comprise one or more natural or synthetic materials, such as polyester, polyethylene, nylon, K-Spec® (Slingmax®, Inc., comprising a proprietary blend of fibers), high-modulus polyethylene ("HMPE"), liquid crystal polymer ("LCP"), aramid, para-aramid, or other suitable synthetic material. The material of the core 52 may relate to the maximum weight the sling 50 is designed to lift, and the environment in which the sling 50 is preferably used. In general, synthetic strands 54 have a high lifting and break strength, lighter weight, high temperature resistance and high durability, compared to wire rope or metal chain slings. In addition, the cover 56 preferably limits damage to the core 52 and surfaces of the objects that are being lifted and related equipment that comes into contact with the cover 56 during use.

The core 52 is preferably positioned within the protective cover 56. The core 52 generally bears substantially the entire weight of the load to be lifted. The cover 56 generally prevents physical damage to the core 52, for example from abrasion, and sharp edges on the load, as well as protects the core 52 from exposure to harsh environmental conditions such as heat, humidity, ultraviolet light, corrosive chemicals, gaseous materials, or other environmental conditions that may damage or weaken the core 52 materials.

In the preferred embodiment, the core 52 includes a first core 53a and a second core 53b positioned within the cover 56. The first and second cores 53a, 53b are preferably positioned side-by-side within the cover 56 and provide twin load paths to carry loading on the roundsling 50. The roundsling 50 is not limited to including the two cores 53a, 53b and may be constructed with a single core or more than two cores without significantly impacting the function of the roundsling 50. The first and second cores 53a, 53b are preferably positioned within side-by-side chambers 55a, 55b defined by the cover 56, with the cover 56 connected therebetween by a fastening mechanism 57. In the preferred embodiment, the fastening mechanism 57 is comprised of stitching that connects opposing sides of the cover 56 to define the chambers 55a, 55b. The roundsling 50 is not limited to inclusion of the fastening mechanism 57 or to the fastening mechanism being comprised of stitching and may not include the fastening mechanism 57 or the fastening mechanism 57 may be constructed of alternative mechanisms, such as adhesive bonding, integral forming, clamping or other mechanisms that facilitate forming of the first and second chamber 55a, 55b within the cover 56.

The electronic overload inspection and warning system 10 preferably includes a wireless sensor system 12 installed within or on the roundsling 50, a wireless base station 14, capable of communicating with multiple roundslings 50 deployed in the field, and an operator terminal 16 (shown schematically in FIG. 3) usable by an operator to monitor and visualize loads on the multiple roundslings 50 deployed in the field and preferably displaying loading information and overload indications. Communication between the sensor system 12 and the base station 14 preferably provides real-time, continuous loading information for each of the multiple roundslings 50 deployed in the field.

Figure 3:
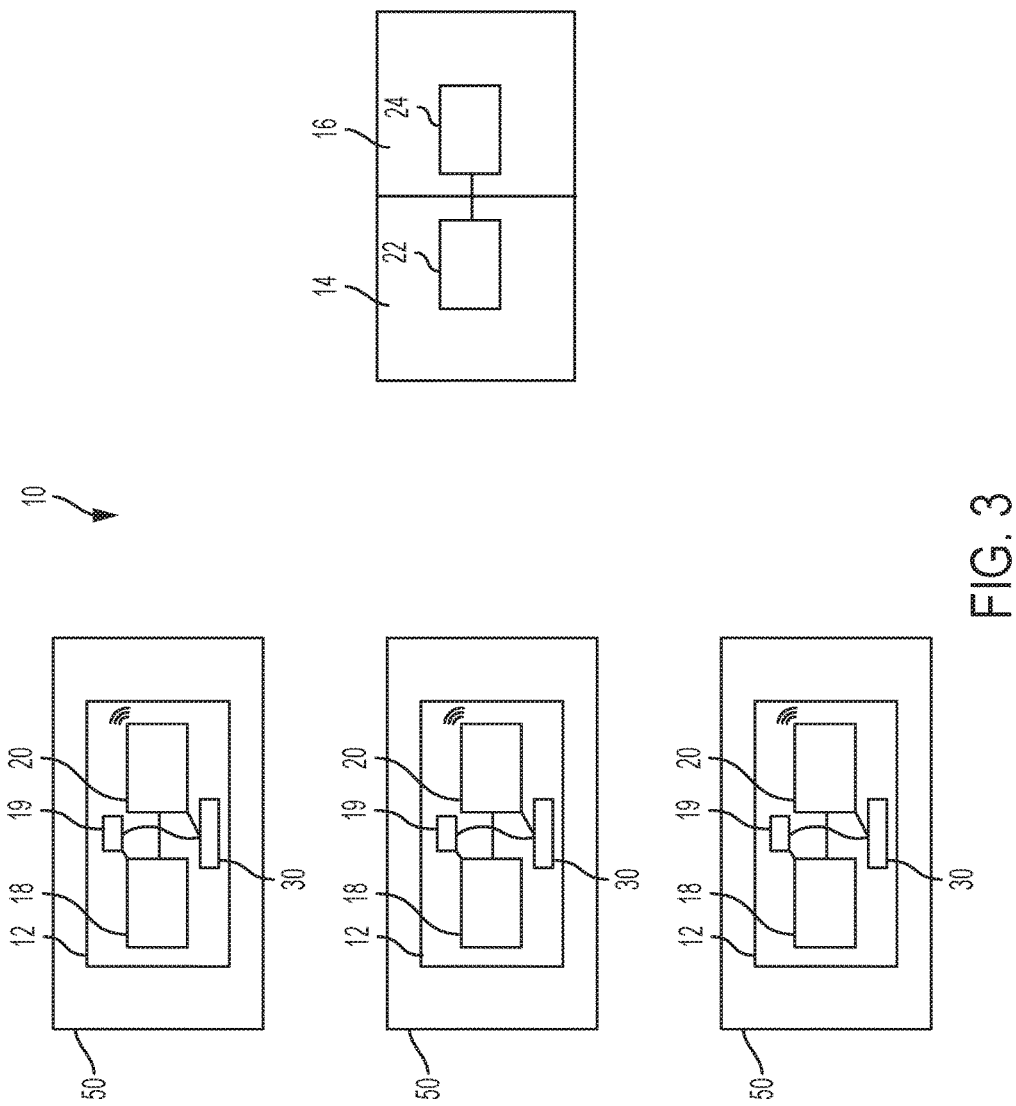
FIG. 3 is a schematic diagram of the electronic overload inspection and warning system in accordance with the preferred embodiment of the present invention.

In the preferred embodiment, and as shown schematically in FIG. 3, the sensor system 12 includes a strain gauge 18 for measuring strain (elongation) of each of the roundslings 50 of the multiple roundslings 50 deployed in the field. For example, the strain gauge 18 may be a two-axis strain gauge for measuring both axial and transverse loads. The strain gauge 18 may be configured to address temperature compensation, as is generally known in the art. The strain gauge 18 may also be comprised of a plurality of strain gauges 18 that measure strain in various directions and orientations, such as a four gauge bridge or Wheatstone Bridge configuration. The strain gauge 18 may further be comprised of a plurality of gauges positioned for measuring strain and stress on the cores 53a, 53b and cover 56. The strain gauge 18 is preferably battery operated, and is preferably powered by a battery source 19 providing a minimum one year battery life, but is not so limited. The strain gauge 18 may be configured to have nearly any duration of battery life, such as about two to three years of battery life. The battery 19 may be comprised of, for example, a one thousand milliampere-hour (1000 mAh) primary (non-rechargeable) lithium battery 19 (e.g., Panasonic CR 2477). In addition, the battery 19 may be configured for recharging during deployment of the roundsling 50. The battery 19 may, for example, be comprised of an energy-harvesting battery 19 that recharges when subjected to vibrations, such as when the roundsling 50 is in use or being rigged. Alternatively, the battery 19 may be comprised of a solar rechargeable battery 19 that is connected to a solar recharging strip 19a (FIG. 1) mounted to an external surface of the roundsling 50. When the solar recharging strip 19a is exposed to solar energy during deployment, the strip 19a preferably provides electrical recharging energy to the battery 19 to limit the return of the roundsling 50 to the manufacturer for replacement of the battery 19 and, therefore, potentially extended operating life for the roundsling 50 before the roundsling 50 is returned to the manufacturer or repaired. The battery 19 may alternatively be comprised of a piezoelectric power cell that generates power or electricity when under load and also stores the generated electricity well beyond the time of generation. Such a piezoelectric power cell-type battery 19 may be configured with the roundsling 50 to generate electricity when the roundsling 50 is loaded and store the electric energy to power the strain gauge 18, transmitter 20 and any additional components of the preferred roundsling 50. The strain gauge 18 is preferably, electrically connected to a wireless transmitter 20. For example, without limitation, the wireless transmitter 20 may be a Lord MicroStrain SG-Link-OEM-LXRS wireless 2-channel analog input sensor node. Optionally, the transmitter 20 may have an external whip antenna (not shown).

In the preferred embodiment, the batteries 19 are removable and replaceable from the roundsling 50, such that the batteries 19 may be removed and replaced at predetermined intervals. The batteries 19 may be removable and replaceable by the operators or users or may be returned to the manufacturer for removal, replacement and, preferably, maintenance and inspection of the roundsling 50. The manufacturer, for example, may recalibrate the strain gauge 18 when the roundsling 50 is returned for replacement of the battery 19, may conduct visual inspection of the roundsling 50, may test and calibrate an environmental monitoring chip 30, which is described in greater detail below, may qualify or re-qualify the loading recommendations, rated capacity, load capacity or capability of the roundsling 50 and may otherwise inspect and maintain the roundsling 50 for return to the operator.

The strain gauges 18 are preferably bonded to rigid, flat (or gently-curved) surfaces in order to accurately measure strain (or elongation). Prior to the preferred invention, it has been difficult to measure strain directly on roundslings 50, because it is difficult to nearly impossible to reliably adhere strain gauges 18 on either fibers or strands of the roundslings 50 or twisted steel ropes of wire ropes.

The sensor system 12 of the preferred embodiment also includes the environmental monitoring chip 30 that is preferably powered by the battery 19 and is in communication with the transmitter 20. The environmental monitoring chip 30 is preferably configured to monitor changes to the roundsling 50 or geometric properties of the roundsling 50, including changes to the environmental boundary conditions wherein the roundsling 50 is deployed, which may adversely impact the roundsling's performance. The environmental monitoring chip 30 may sense various features of the roundsling 50 and its operating environment during use, such as temperature, humidity, pH, sunlight, ultraviolet radiation, chemical presence and exposure, vibration, conductivity, moisture, and related features of the roundsling 50 and its environment that may impact the roundsling's performance, load rating or useful life. The environmental monitoring chip 30 may also sense the presence of hazardous chemicals or gases near or around the roundsling 50, such as combustible chemicals or gases, radiation, chlorine, carbon monoxide, reduced levels of oxygen, high levels of airborne contaminants, organic vapors, asbestos, metals, pesticides, immediately dangerous to life or health chemical or gas conditions, carcinogens, toxins, irritants, corrosives, sensitizers, hepatotoxins, nephrotoxins, neurotoxins as well as agents that act on the hematopoietic systems or damage the lungs, skin, eyes, or mucous membranes and other related or similar hazardous chemicals or gases. In addition to monitoring environmental conditions that may negatively impact the roundsling 50, the environmental monitoring chip 30 could act as a warning for conditions that may be unsafe for the people, operators or technicians using the roundslings 50. These conditions could include toxic, flammable, or explosive chemicals and low oxygen levels.

The environmental monitoring chip 30 preferably periodically senses these features and transmits the features to the transmitter 20, which subsequently transmits the information to the wireless base station 14. The plurality of sensed features, including the loading features detected by the strain gauge 18 are utilized to consider the totality of exposure of the roundsling 50 to loads and environment during use, to statistically analyze the sensed features and preferably determine the current state of the roundsling 50. The statistical analysis is preferably able to predict the ability of the specific roundsling 50 to perform its intended function in light of aging and degradation resulting from use of the roundsling 50 and the environment in which the roundsling 50 is used. For example, the history of loading and environment of a plurality of roundslings 50 available for use by an operator may be considered based not only on their ratings developed when they shipped in new condition from the factory, but also following their own unique loading and environmental histories. Such analysis and historical consideration may permit roundslings 50 having histories of light loads in favorable environmental conditions to have an extended life and limit the need to dispose and replace such roundslings 50 before their real useful life is attained. Likewise, a roundsling 50 that is exposed to extreme loading and unfavorable environmental conditions may be removed from service prior to a standard useful lifetime based on its unique loading and environmental history, which can improve safety of rigging or lifts involving such roundsling 50. The frequency of sampling using the environmental monitoring chip 30 may be standardized such that the chip 30 collects specific features after a predetermined time period or may be variable, such as the chip 30 sampling particular features more frequently when the roundsling 50 is loaded and less frequently when the roundsling 50 is unloaded. Furthermore, the environmental monitoring chip 30 may collect and store data from its sensors for an arbitrary period of time, and it may transmit all of the stored data or merely a fraction of the stored data to the base station 14.

The environmental monitoring chip 30 of the preferred embodiment may be comprised of a System-on-a-Chip ("SoC") integrated circuit comprised of various sensors, a processing unit, and a data storage unit. The preferred SoC chip 30 may be mounted to the roundsling 50 without taking significant space in the roundsling 50 and is preferably configured to measure various features of the roundsling 50 and the associated working environment to transmit data to the base station 14 for environmental and load monitoring purposes.

Figure 5:
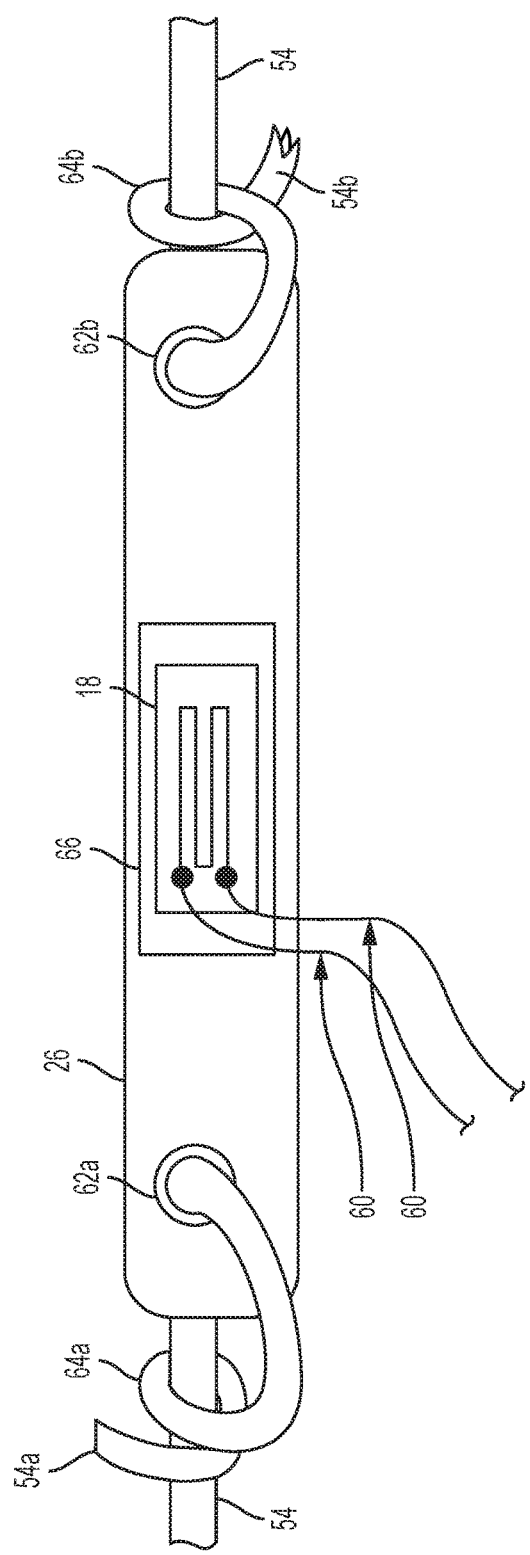
FIG. 5 is a top plan view of a first preferred carrier plate of the electronic overload inspection and warning system of FIG. 1, wherein the carrier plate is attached to strands of the roundsling and includes a strain gauge mounted thereto.

Referring to FIGS. 5-5D, in preferred embodiments, a carrier element or plate 26 is mounted in series (in line) with the load-bearing strands 54 of the lifting core 52. In these preferred embodiments, the carrier plate 26 is inserted between two ends of a load-bearing strand 54 of the core 52 (shown schematically in FIG. 5). FIG. 5 shows a first preferred embodiment of the carrier plate 26 having a substantially block-shape and FIGS. 5A-5D show a second preferred embodiment of the carrier plate 26 having a cylindrical or pill-shape, although both the first and second preferred embodiments are identified with like reference numerals indicating similar features. The carrier plate 26 is preferably attached to the load-bearing strand 54 by inserting a first end 54a of the strand 54 through a first hole 62a in the carrier plate 26 and making a first knot 64a to secure the first end 54a to the first hole 62a and the carrier element 26 and subsequently inserting a second end 54b of the strand 54 through a second hole 62b in the carrier plate 26 and making a second knot 64b to secure the second end 54b to the second hole 62b and the carrier element 26. The first end 54a and the second end 54b of the strand 54 are not necessarily secured to the first and second holes 62a, 62b of the carrier element 26 by the knots 64a, 64b and may be otherwise secured to the carrier element 26, such that the carrier element 26 is subjected to nearly the same loads as are carried by the strand 54 during use. For example, the first and second ends 54a, 54b of the strand 54 may be clamped, fastened, adhesively bonded or otherwise secured to the carrier plate 26 in a manner that will withstand the typical operating conditions of the roundsling 50 and have the ability to carry the loads typically encountered by the roundsling 50 and the individual strands 54. In addition, the carrier element 26 is not limited to having the first and second holes 62a, 62b for securing to the first and second ends 54a, 54b of the strand 54 and may be configured as an alternate fastening mechanism, such as a clamp or fastener or may be otherwise designed and configured to accept securing of the first and second ends 54a, 54b thereto.

By virtue of being in series (in line) with the load path of the individual strand 54, the carrier plate 26 preferably carries substantially the same load as the individual strand 54 and the other strands 54 in the load-bearing core 52. In the preferred embodiment, the carrier plate 26 has a flat (or gently-curved) surface or receptacle 66 where the strain gauge 18 is preferably securely bonded to the carrier plate or element 26. The carrier plate 26 may be constructed of nearly any rigid substance that is able to take on the general size and shape of the carrier element 26, is able to withstand the normal operating conditions of the carrier element 26 and is suitable for the strain characteristics of the strain gauge 18, such as, but not limited to aluminum, steel, stainless steel, 316 stainless steel, composite, or a multitude of other substantially rigid materials. Electrical leads 60 preferably carry the strain signal out of the strain gauge 18 and to the transmitter 20 for signal processing and subsequent transmission to the base station 14.

In the second preferred embodiment, the carrier plate 26 has a substantially cylindrical shape, with the receptacle 66 formed on its surface in order to attach the strain gauge 18, such that the strain gauge 18 is oriented to measure strain substantially along a longitudinal axis 25 of the carrier plate 26. The carrier plate 26 is not limited to having substantially cylindrical configurations and may be formed in a multitude of cross-sectional shapes, including circular, rectangular, square, oval, triangular, tubular, hollow cylinder and other shapes that are able to withstand the ordinary operating conditions of the roundsling 50, attach to the first and second ends 54a, 54b of the strand 54, carry the load imparted from the strand 54 and effectively mount the strain gauge 18 during normal operating conditions of the roundsling 50. The strain gauge 18 may be bonded to the receptacle area or surface 66 on the carrier plate 26 or may be mounted at alternative locations on the carrier element 26. Depending on the shape and curvature of the carrier plate 26, the receptacle area 66 may be flat or gently-curved, but is not so limited and may have nearly any size and shape that is able to withstand the normal operating conditions of the carrier element 26 and perform the typical functions of the carrier element 26. Furthermore, depending on the shape and curvature of the carrier plate 26, there may not be a need for a distinct receptacle area 66. For instance, on a substantially flat, rectangular, boxy or parallelepiped carrier plate 26, the strain gauge 18 may be bonded to any region or surface of the carrier plate 26 that is able to receive the strain gauge 18 without the need for a distinct receptacle 66.

In the second preferred embodiment, the carrier element or plate 26 has a length L and a diameter D with substantially hemispherical ends positioned along the longitudinal axis 25. The length L and diameter D are preferably sized to correspond to the general size of the individual strand 54 to which the carrier element 26 is connected, but are not so limited. In the preferred embodiment, the carrier element 26 may have a length of approximately two to three inches (2-3") and a diameter of approximately one-half to one inch (½-1"), but is not so limited. The receptacle area 66 of the preferred embodiments has a receptacle length x of approximately one-quarter to three-quarters of an inch (¼-¾") and a receptacle width y of approximately one-quarter to one-half inch (¼-½"), but is not so limited and may have nearly any size and shape that is able to accept the strain gauge 18 or may be excluded from the carrier element 26 when the strain gauge 18 is mounted directly to the side of the carrier element 26, as is described above. The first and second holes 62a, 62b of the first preferred embodiment have a substantially consistent hole diameter d (not labeled) of approximately three-eighths inches (⅜"), but are not so limited and may have nearly any size, shape or configuration to accept the ends 54a, 54b of the strand 54 or may be excluded from the carrier plate 26, as was described above. Alternatively, in the second preferred embodiment, the holes 62a, 62b have a substantially oblong-shape, with a major length $H_1$ of approximately one-quarter to one-third of an inch (¼-⅓") and a minor length $H_2$ of approximately one-eighth to three-eighths of an inch (⅛-⅜"). The holes 62a, 62b of the second preferred embodiment are not limited to being substantially oblong-shaped and may have a substantially constant diameter, may be eliminated from the carrier plate 26 or may take on an alternative size and shape that is able to accept the ends 54a, 54b of the strand 54 and withstand the normal operating conditions of the carrier element 26.

Figure 6A:
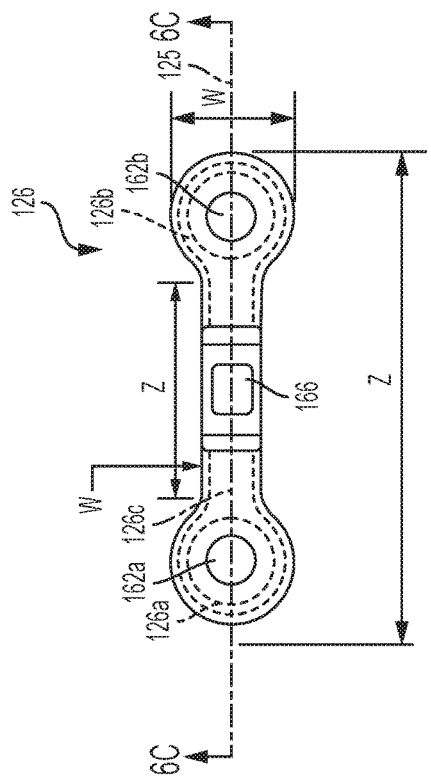
FIG. 6A is a top plan view of the carrier plate of FIG. 6.
Figure 6:
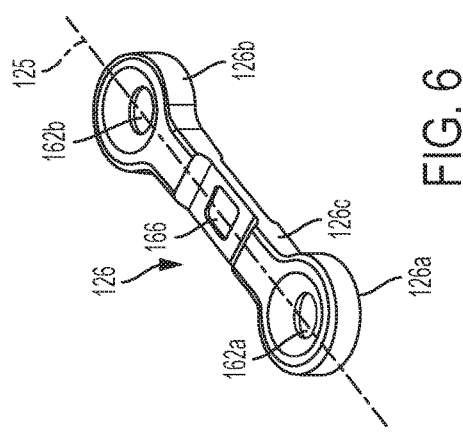
FIG. 6 is a top perspective view of a third preferred carrier plate of the preferred electronic overload inspection and warning system of FIG. 1.
Figure 6C:
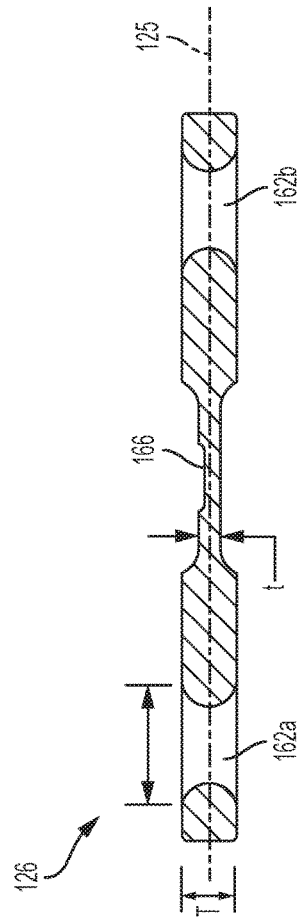
FIG. 6C is a cross-sectional view of the carrier plate of FIG. 6, taken along line 6C-6C of FIG. 6A.
Figure 6B:
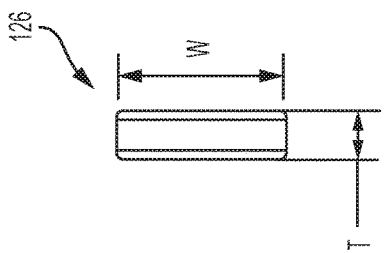
FIG. 6B is a side elevational view of the carrier plate of FIG. 6.

Referring to FIGS. 6-6C, in a third preferred embodiment, a carrier element 126, having similar function and features to the first and second preferred carrier elements 26, may also be mounted in series (in line) with the load bearing strands of the lifting core 52. The carrier element 126 of the third preferred embodiment is described herein with like reference numerals indicating like features and a "1" prefix distinguishing the third preferred carrier element 126 from the first and second preferred carrier elements 26. The lifting core 52 is preferably connected to the carrier element 126 at first and second holes 162a, 162b such that the carrier element 126 carries substantially the same load as the individual strands 54 during use. A receptacle 166 is preferably formed in the carrier element 126 and is sized and configured to receive a strain gauge (not shown) that measures load and strain on the carrier element 126. In the third preferred embodiment the receptacle 166 is inset into the surface of the carrier elements 126, bus is not so limited and may be substantially flush with the surfaces of the carrier element 126 and may be located at different locations on the carrier element 126. The carrier element 126 is preferably constructed of a relatively strong and stiff metallic material, such as steel, stainless steel, 316 stainless steel, aluminum, 7075 aluminum or other relatively strong and stiff materials that are able to take on the general size and shape of the carrier element 126 and withstand the normal operation conditions of the carrier element 126, such as a composite material.

In the third preferred embodiment, the carrier element 126 has a substantially dog bone-shape or dumbbell-shape with relatively wide first and second ends 126a, 126b and a relatively narrow central section 126c. The carrier element 126 has an overall carrier length Z, a central section length z, a major width W measured as the diameter of the first and second ends 126a, 126b in the plan view, a minor width w of the central section 126c, a major thickness T measured at the first and second ends 126a, 126b and a minor thickness t measured in the central section 126c proximate the receptacle 166. In the third preferred embodiment, the overall carrier length Z is approximately four to five inches (4-5"), preferably four and three-quarters inches (4¾"), the central section length z is approximately two to three inches (2-3"), preferably two and one-quarter inches (2 V), the major width W is approximately one to one and one-half inches (1-1½"), preferably one and one-quarter inches (1¼"), the minor width w is approximately one-half to three-quarters inches (½-¾"), preferably six tenths inches (0.6"), the major thickness T is approximately one-quarter to one-half inches (¼-½") and the minor thickness t is approximately one-tenth to one-quarter inches (1/10-¼"), preferably one-sixth of an inch (⅙"). These dimensions for the third preferred carrier element 126 are not limiting and the carrier element 126 may be sized and configured in nearly any manner that permits engagement with the core strand 54 such that the carrier element 126 carries the load of the core strand 54 during use, is able to be mounted to the core strand 54 and withstands the normal operating conditions of the carrier element 126, as is described herein. The carrier element 126 also preferably has curved or arcuate surfaces when transitioning between its various surfaces, such as the sidewalls of the first and second holes 162a, 162b, the external surfaces of the first and second ends 126a, 126b and when transitioning between the first and second ends 126a, 126b and the central section 126c. These arcuate and curved surfaces are preferably designed and configured to limit damage to the core strands 54 and other portions of the core 52 and cover 56 if these elements rub, slide or are positioned against the carrier element 126. In the third preferred embodiment, the first and second holes 162a, 162b have inner curves surfaces that form a substantially hyperboloid-shape to facilitate engagement with the core strands 54, but are not so limited and may have nearly any size or shape that is able to accept the core strands 54 or engage with the core strands 54, preferably an arcuate or curved surface. In addition, the first and second holes 162a, 162b may have an oval-shape, similar to the first and second holes 62a, 62b of the second preferred embodiment.

Figure 7C:
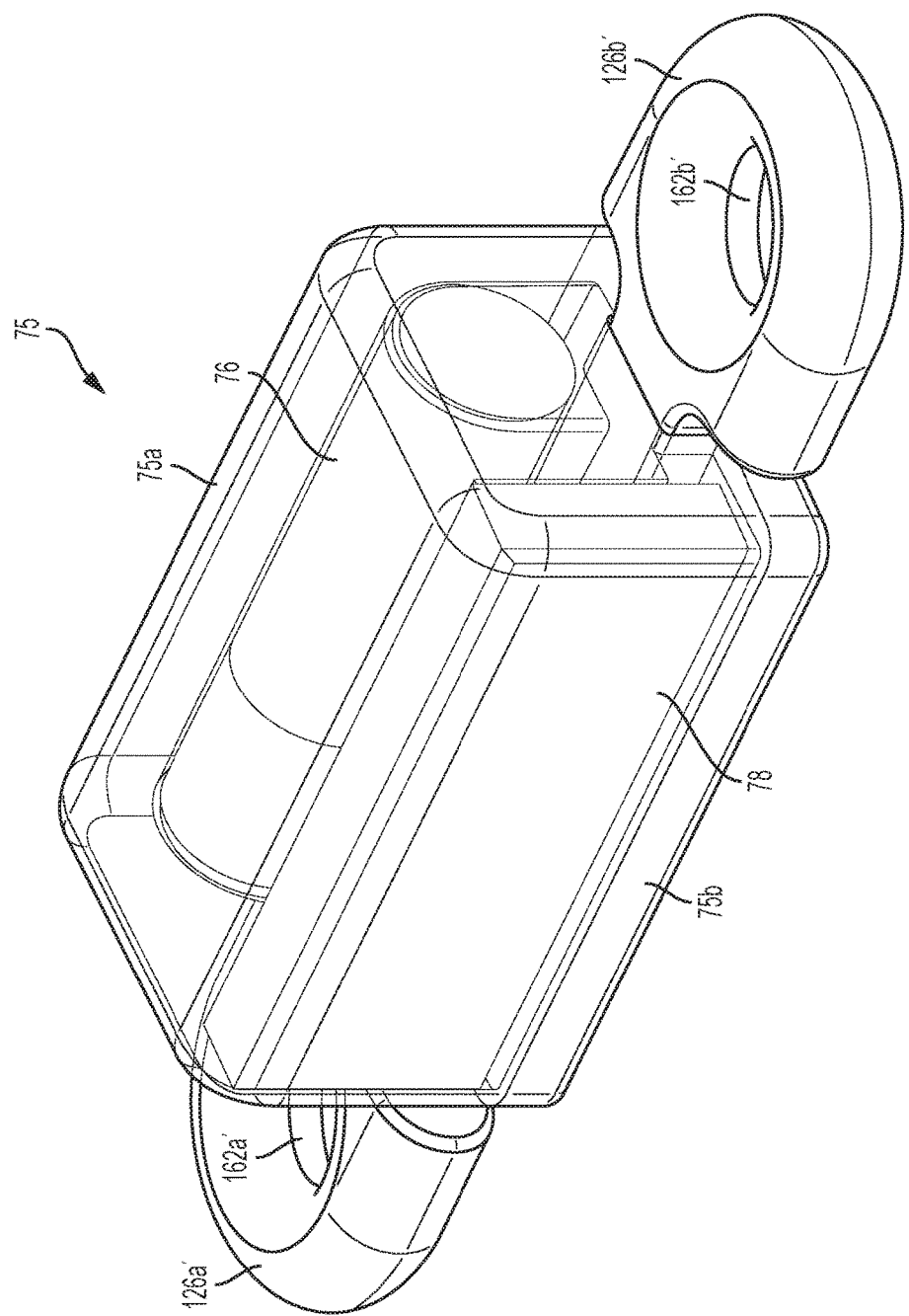
FIG. 7C is a top perspective view of the carrier plate of FIG. 7A partially enclosed in the housing of FIG. 7B, wherein a top housing portion is shown as partially transparent.

Referring to FIG. 7A, a fourth preferred carrier element 126' has a similar construction to the third preferred carrier element 126 and like reference numbers are utilized to identify like features of the fourth preferred carrier element 126' with a prime symbol (') utilized to distinguish the fourth preferred embodiment from the third preferred embodiment. The fourth preferred carrier element 126' has slightly squared edges or corners of the first and second ends 126a', 126b' in comparison to the more rounded edges of the third preferred embodiment and does not include an indentation in the central section 126c' for receipt of the strain gauge. The fourth preferred carrier element 126' is otherwise substantially constructed in the same manner as the third preferred carrier element 126.

The fourth preferred carrier element 126' preferably includes sealing rings 140 positioned on or overmolded onto the central section 126c' proximate opposite ends of the central section 126c' near the first and second ends 126a', 126b'. The sealing rings 140 are preferably constructed of a rubber-like material that permits sealing of the central section 126c' with a housing 75 that may be engaged to the carrier element 126'. The housing 75 provides protection for the strain gauge 18 and other electronic equipment of the electronic overload inspection and warning system 10. The electronic overload inspection and warning system 10 is not limited to inclusion of the sealing rings 140 for sealing the housing 75 relative to the carrier elements 26, 126, 126' and the housing 75 and carrier elements 26, 126, 126' may be otherwise designed and configured to protect and seal the electronic components of the electronic overload inspection and warning system 10 during operation, such as by over-molding a polymeric material or film over the components and the carrier elements 26, 126, 126' or otherwise covering and protecting the electronic components.

Referring to FIGS. 5-7C, in the preferred embodiments, the carrier element 26, 126, 126' is at least partially enclosed by the housing 75, particularly over the strain gauge 18. The housing 75 preferably includes a top housing portion 75a and a bottom housing portion 75b. The top and bottom housing portions 75a, 75b are preferably constructed of a polymeric material, such as Acrylonitrile Butadiene Styrene ("ABS"), but are not so limited and may be constructed of nearly any polymeric, metallic, wooden or other structural material that is able to take on the general size and shape of the housing 75, perform the preferred functions of the housing 75 and withstand the normal operating conditions of the housing 75. The top and bottom housing portions 75a, 75b preferably snap together over the central section 126c, 126c' of the carrier elements 26, 126, 126' and engage the sealing rings 140 to inhibit flow of external liquid and air into the housing 75. The top and bottom housing portions 75a, 75b are preferably force snapped, welded or bonded together such that detaching the top housing portion 75a from the bottom housing portion 75b from a working configuration is difficult for a user. Preferably, during field use, the housing 75 is not opened or separated and is only opened when returned for inspection and maintenance to the manufacturer. The housing 75 is not limited to being difficult to open for a user and may be configured for opening and closing by a user for inspection, maintenance or other operations.

The preferred housing 75 includes a battery 76 and a circuit board 78 enclosed therein. The battery 76 preferably provides power for the circuit board 78, which may include at least the wireless transmitter 20 and a controller (not shown). The housing 75 provides protection and structural support for the wireless transmitter and controller. The housing 75 is not limited to including the wireless transmitter 20, battery 76 and circuit board 78 therein, but inclusion of these electronic components in the housing 75 is preferred to provide environmental protection and structural support for these components.

Referring to FIGS. 1-8, the wireless base station 14 preferably includes a wireless receiver 22, for wirelessly receiving data from the wireless transmitter 20. For example, the preferred receiver 22 may be a Lord MicroStrain WSDA-BASE-104 USB gateway node, but is not so limited and may be comprised of nearly any receiver 22 that is able to wirelessly receive data from the wireless transmitter 20, withstand the normal operating conditions of the receiver 22 and otherwise perform the preferred functions of the receiver 22, as is described herein. The wireless transmitters 20 and receiver 22 preferably exhibit a minimum of about a one hundred fifty foot (150') communication range, and preferably, approximately a five hundred foot (500') communication range, but are not so limited and may have a shorter or longer communication range. For instance, using cellular communication protocols, the wireless transmitter 20 and receiver 22 may communicate at nearly any range, even across a continent or around the earth. In addition, the preferred system is not limited to configurations including the wireless transmitters 20 and receiver 22 by hard wiring the strain gauges 18 directly to the base station 14. Wireless signal transmission is preferred for the system, however, particularly when the base station 14 is monitoring loads on multiple roundslings 50.

The receiver 22 is preferably electrically connected to a computing device 24 in the operator terminal 16, such as, for example, a computer, tablet, smart phone, or the like, capable of computing and manipulating the data received, visualizing and monitoring the sling loads, and displaying overload indicators. In one embodiment, the computing device 24 is a Windows laptop or PC having a data acquisition and device programming software (e.g., LabView or the like) and offline data analysis software (e.g., Microsoft Excel or the like). The computing device 24 is preferably capable of statistically analyzing the acquired data from the strain gauge 18 and the environmental monitoring chip 30 to determine a predicted current state or health of the roundsling 50 based on the various sensed features of the roundsling 50 and its working environment. The computing device 24 also preferably has at least one connection port, e.g., a USB or other serial or parallel port, for connecting with the receiver 22, but is not so limited.

At a minimum, the computing device 24 preferably calculates the stress on the roundsling 50 according to the strain data received from the wireless sensor system 12 of one or more of the roundslings 50 and the modulus of elasticity of the respective carrier plate material (Stress=Strain*Modulus of Elasticity). The receiver 22 may be configured to communicate with multiple transmitters 20 deployed in the field simultaneously (three sensor systems 12 shown in FIG. 3 for illustrative purposes), e.g., three roundslings 50, and, therefore, the multiple roundslings 50 may be monitored simultaneously from the base station 14. The receiver 22 may alternatively be configured to communicate with a single transmitter 20 associated with a single roundsling 50, two roundslings 50 or many more than three roundslings 50. The force imparted on the roundsling 50 by the load may be estimated by multiplying the measured stress with the surface area of the carrier element 26. The force may then be converted to a weight estimate for the load using physics calculations are generally known by those having ordinary skill in the art.

In order to account for differences in construction in each sling, a system of calibration can be employed to compensate for differences in the tension applied to the carrier element 26. The roundsling 50 may be placed in a tensile tester in line with a calibrated load cell and put under a series of known loads. These loads may be entered into a computer that is wirelessly communicating with the wireless transmitter 20. By matching the signal from the strain gauge 18 with the known load, a calibration curve can be generated that allows for accurate readings of loads in use. In order to simplify the process a calibration mode can be included with the computing device 24. The mode can prompt the operator through the process of calibrating and automatically load the transmitter with the final calibration information. In addition, when the roundsling 50 is returned for maintenance or on a predetermined schedule, the roundsling may be recalibrated in the same manner and the final calibration information can be reloaded to compensate for any changes in the original calibration.

Figure 4:
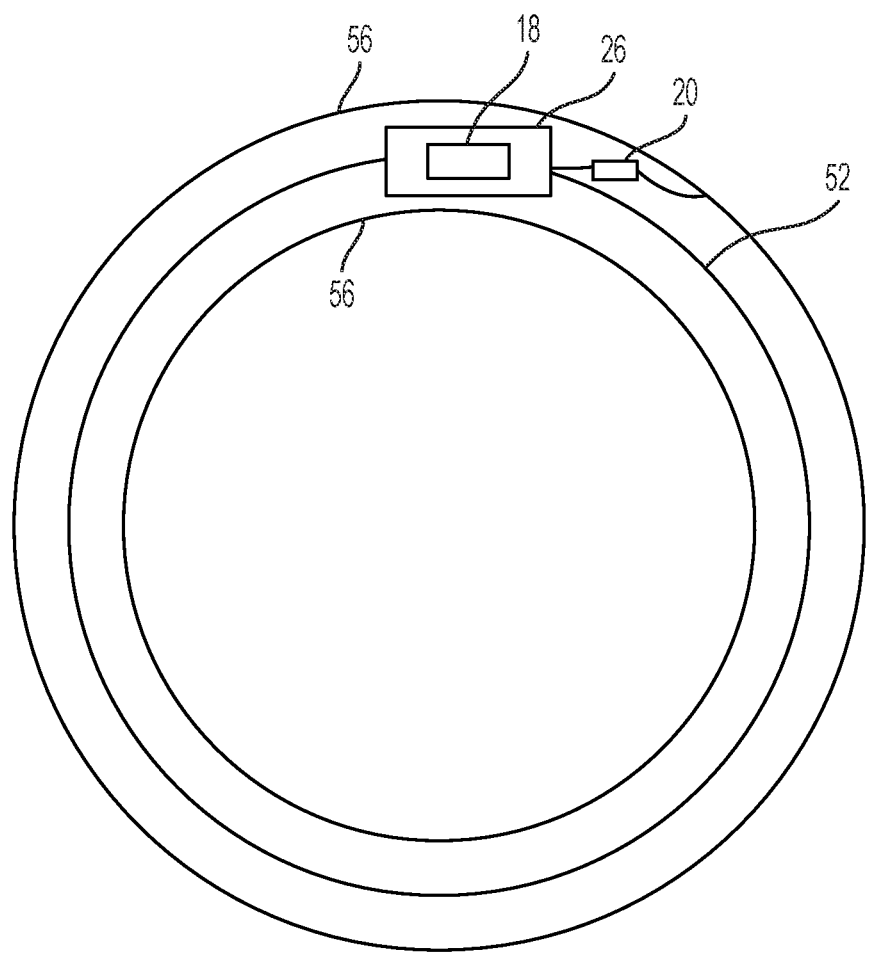
FIG. 4 is a front elevational, schematic view of the electronic overload inspection and warning system of FIG. 3, installed in a roundsling with portions of the roundsling being transparent for clarity.

The strain gauge 18 is preferably of compact size, in order to universally fit in substantially any size roundsling 50. As shown in FIG. 4, the strain gauge 18 may be installed on the carrier plate or element 26 and attached between the two ends 54a, 54b of the strand 54 of the core 52. The carrier plate 26 of the first preferred embodiment is utilized as an example in the following description and the carrier plates 26, 126, 126' of the second, third and fourth preferred embodiments may also be utilized with the roundsling 50 in a similar or the same manner as is described below. The carrier plate 26 is preferably placed inside of the protective cover 56, thereby protecting the gauge 18 from environmental hazards, such as water, oil or electromagnetic ("EM") radiation. In one preferred embodiment, the wireless transmitter 20 is also installed in a protective pocket attached to the sling cover 56, e.g., in the form of a short tail. The tail may be of a different color material in order to indicate the presence of sensitive electronics inside. Electrical connections within the roundsling 50 are preferably protected at least by the protective cover 56 and may be further protected by additional covers, materials or placement, such as centrally within the core strands 54. The carrier plate 26, strain gauge 18, wireless transmitter 20 and related components are not limited to being mounted within the cover 56, but are preferably mounted therein for connection to the strands 54 and to provide protection of these components during field use. For example, in the fourth preferred embodiment, the circuit board 78, battery 76 and strain gauge 18 are mounted within the housing 75 to provide structural and environmental protection for the electronic components of the electronic overload inspection and warning system 10.

In the preferred embodiments, the electronic overload inspection and warning system 10 is battery-powered and power-saving measures are preferably utilized in order to extend battery life. The electronic overload inspection and warning system 10 may alternatively be powered using other means including household electricity or an electrical generator, thus limiting the preference for power-saving measures. In the preferred embodiment, prior to loading the roundsling 50, the transmitters 20 and receiver 22 are powered on. Upon powering, the transmitters 20 and receiver 22 are preferably left in low-power sleep mode for battery preservation. In sleep mode, the transmitters 20 and receiver 22 periodically wake up and wait for wake signals from the base station 14. When a wake signal is received, the transmitters 20 and receiver 22 preferably enter into the low duty cycle mode with event-based sampling. In this preferred low duty cycle mode, the receiver 20 starts sampling the transmitters 20 at a low frequency (e.g., 1 Hz) but only transmits data to the computing device 24 if a certain, predetermined event takes place. In the case of the sling application, the expected event is the measurement of a non-zero load on the strain gauge 18, which is preferably transmitted from the transmitter 20 to the receiver 22.

When the roundsling 50 is loaded and the wake signal is sent from the transmitter 20 to the receiver 22, the strain gauge 18 preferably measures elongation of the carrier plate 26, 126, 126'. The measured data and any overload indicator integrity data is preferably, wirelessly transmitted from the transmitter 20 to the receiver 22 at preset intervals. The receiver 22 relays the data to the computing device 24 for additional data processing, visualization, alerting, and/or storage. Trigger signals, e.g., a stress value that is greater than an associated maximum safe stress value, preferably induce an alarm by the operator terminal 16, e.g., an audible alarm, a written message, a text message to the operator's phone, a visual alarm, a signal to the equipment to lock operation, or the like. As should be understood, the receiver 22 may receive data from multiple transmitters 20 deployed in multiple roundslings 50. Data calculated by, and displayed on, the computing device 24 indicates the respective roundsling 50 and the associated stress and/or strain associated with the roundslings 50.

In addition to the wake signal, the base station 14 preferably pings each transmitter 20 at regular intervals in order to confirm the sensor system 12 is available and operational. The transmitters 20 and receiver 22 also preferably return into low-power sleep mode after a predetermined period of inactivity, such as one to five hours (1-5 hrs).

In addition to being employed alone, the electronic overload inspection and warning system 10 may also be employed to function with other pre-failure warning indicators, such as, for example, without limitation, the pre-failure warning indicator taught in U.S. Pat. No. 9,293,028, issued Jul. 16, 2015 with a title, "Roundslings with Radio Frequency Identification Pre-Failure Warning Indicators," which is hereby incorporated by reference in its entirety.

Figure 2:
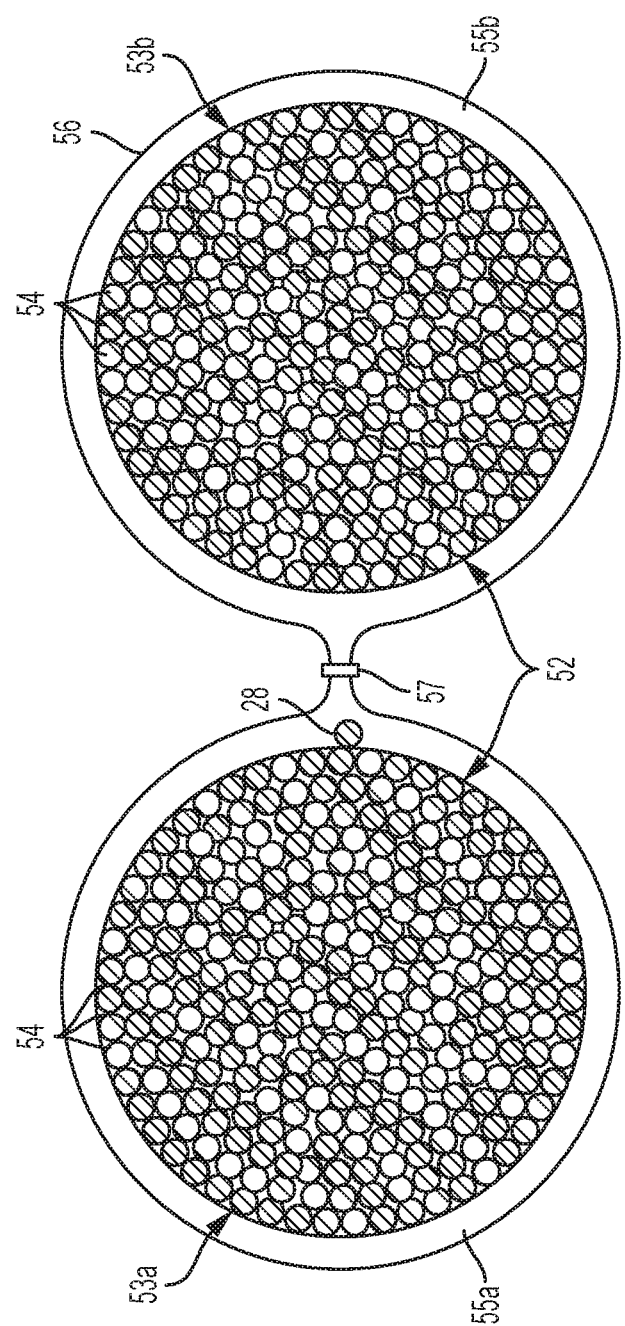
FIG. 2 is a cross-sectional view of the exemplary roundsling of FIG. 1, taken along section line 2-2.
Figure 8:
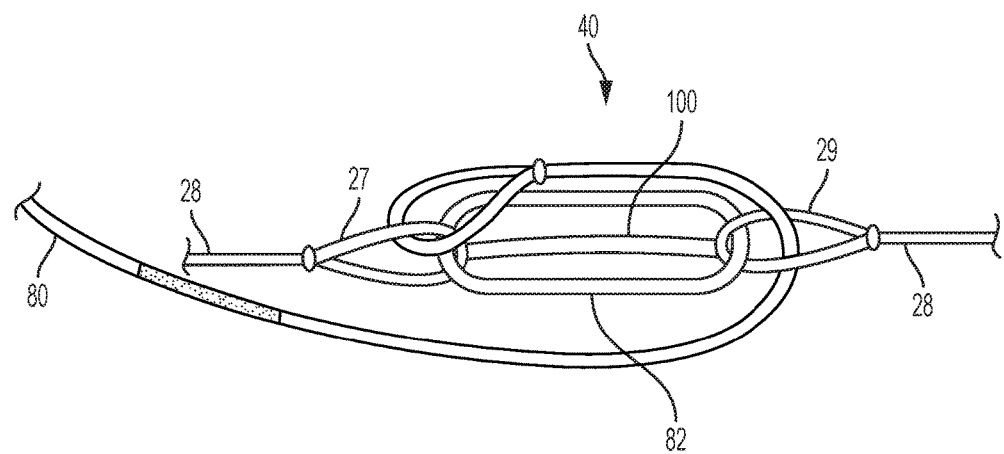
FIG. 8 is a side elevational view of a failure indicator system in accordance with a preferred embodiment of the present invention.

Referring to FIGS. 1, 2 and 8, an insulated conducting wire 100, such as a twelve-gauge copper wire, may be tied between two eye-loops 27, 29 on a failure indicator system 40 and in parallel with a dedicated strand 28. The dedicated strand 28 is preferably positioned within or on the core 52. The dedicated strand 28 is preferably different from the strands 54 that make up the core 52. The dedicated strand 28 is preferably placed proximate the core 52, for example, the dedicated strand 28 may be twisted around one or more of the core strands 54 or the dedicated strand 28 may lay next to the core 52, as illustrated in FIG. 2. In some aspects, the dedicated strand 28 is affixed to the inside of the cover 56. When a roundsling 50 is used over a period of time, the cover 56 may develop wear points at specific locations, for example, where the roundsling 10 hangs from a crane's hook. Accordingly, it may be desirable to rotate the cover 56 with respect to the load-bearing core 52. By securing the dedicated strand 28 to the cover 56 interior, movement of the cover 56 (either intentionally or non-intentionally) will typically not impact the operation of the pre-failure indicator assembly 40. When the first eye-loop 27 and second eye-loop 29 are connected together via a ring 82, the dedicated strand 28 plus the ring 82 form an endless loop. The shape of the separate dedicated strand 28 generally matches the shape of the endless parallel loops formed by the core strands 54 (e.g., generally circular or oval). The ring 82 may comprise any suitable shape.

The wire 100 preferably serves as a continuity tester. When an overload situation occurs, the dedicated strand 28 breaks, preferably at a load slightly less than the rated load of the strands 54 and the eye-loops 27, 29 are thrust apart, resulting in the breakage of the wire 100 serving as the continuity tester. The wire 100 is preferably in communication with the transmitter 20. When the continuity of the wire 100 is severed as a result of an overload event, the transmitter 20 generates an alert signal and transmits the signal to the receiver 22. The overload signal thus generated may be transmitted using a multitude of methods (including wired transmission, wireless transmission, light signals, audio warnings, and such). The base station 14 may subsequently provide a warning to the operators and riggers or otherwise limit operation of the lift to prevent breakage of the roundsling 50.

The roundsling 50 may also include an indicator yarn 80. The cover 56 may comprise an opening through which the indicator yarn 80 may pass through, with a length of the yarn 80 and one terminal end thus located inside of the cover 56, and a length of the yarn 80 and the other terminal end thus located outside of the cover 56. The opening may be located at any suitable position in the cover 56. The yarn 80 preferably is of a bright color, including yellow, orange, red, or a combination thereof, or other suitably visible or contrasting color so that a user may monitor the visible end portion of the yarn 80. For example, in the event that the roundsling 50 is overstretched or overloaded, the visible portion of the yarn 80 may become shorter as the yarn 80 is pulled into the cover 56, with the shortening of the visible section of the yarn 80 signaling the user that the roundsling 50 is overstretched or overloaded. In this sense, the indicator yarn 80 may serve as a redundancy for the failure indicator system 40, as is described above. The indicator yarn 80 may also comprise a component of the failure indicator system 40.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the disclosure.

We claim:

1. An electronic overload inspection and warning system for a roundsling having a strand positioned within a plurality of core strands and a cover, the system comprising:
    a wireless sensor system mountable to the roundsling, the wireless sensor system including at least one strain gauge electrically connected with a wireless transmitter, the strain gauge measuring strain on the strand;
    a wireless base station including at least one wireless receiver configured to wirelessly communicate with multiple deployed wireless sensor systems; and
    a carrier element having a first end and a second end, the first end secured to a first end of the strand and the second end secured to the second end of the strand, the strain gauge secured to the carrier element between the first and second ends of the carrier element.

2. The electronic overload inspection and warning system of claim 1, further comprising:
    an operator terminal including at least a computing device for calculating and displaying stress on the roundsling.

3. The electronic overload inspection and warning system of claim 1, further comprising:
    a battery configured to power the strain gauge, the battery connected to the roundsling.

4. The electronic overload inspection and warning system of claim 3, wherein the battery is configured to recharge when subject to vibration.

5. The electronic overload inspection and warning system of claim 3, wherein the battery is configured to recharge via solar power.

6. The electronic overload inspection and warning system of claim 3, wherein the battery is a piezoelectric power cell.

7. The electronic overload inspection and warning system of claim 1, further comprising:
    an environmental monitoring chip connected to the wireless transmitter, the environmental monitoring chip configured to monitor at least one of temperature, humidity, pH, ambient visible light, ambient ultraviolet light, vibration, conductivity, hazardous chemicals and hazardous gases.

8. The electronic overload inspection and warning system of claim 1, wherein the computing device is configured for computing a predicted health of the roundsling.

9. The electronic overload inspection and warning system of claim 8, wherein the computing device is configured to predict the health of the roundsling by at least receiving measurements and recording the measurements related to each cycle and peak loading of the roundsling.

10. The electronic overload inspection and warning system of claim 1, further comprising:
    an indicator yarn connected to the strand at one end and protruding from the cover at the other end, the indicator yarn configured to retract into the cover when the roundsling is subjected to an overload.

11. The electronic overload inspection and warning system of claim 1, wherein the wireless sensor system and strain gauge are configured to exist in a default low-power sleep state, the wireless base station is configured to transmit a wake signal, the wireless sensor system and strain gauge transferring to a full-powered state upon receipt of the wake signal.

12. The electronic overload inspection and warning system of claim 1, wherein the carrier element includes a first hole at the first end and a second hole at the second end, the first end of the strand connected to the carrier element at the first hole and the second end of the strand connected to the carrier element at the second hole.

13. The electronic overload inspection and warning system of claim 1, wherein the carrier element includes a receptacle, the strain gauge secured to the carrier element in the receptacle, the carrier element has a substantially cylindrical-shape with rounded first and second ends.

14. The electronic overload inspection and warning system of claim 13, wherein the receptacle is comprised of a flat surface on the carrier element.

15. The electronic overload inspection and warning system of claim 1, wherein the carrier element has a longitudinal axis, the longitudinal axis extending through the first and second ends, the strain gauge oriented to measure strain at least along the longitudinal axis.

16. The electronic overload inspection and warning system of claim 1, wherein the carrier element has a major width measured at one of the first and second ends and a minor width measured in a central section of the carrier element, the major width being greater than the minor width.

17. The electronic overload inspection and warning system of claim 1, wherein the carrier element is mounted within the cover of the roundsling.

18. An electronic overload warning system for a roundsling having core strands and a cover, the system comprising:
    a wireless sensor system mountable to the roundsling;
    a wireless base station including at least one wireless receiver configured to wirelessly communicate with the wireless sensor systems;
    a dedicated strand mounted proximate the core strands, the dedicated strand having a load limit less than a rated load of the core strands;
    an indicator yarn connected to the dedicated strand, the indicator yarn including a first terminal end positioned within the cover and a second terminal end positioned outside the cover; and
    a wire connected to the dedicated strand and being in communication with the wireless sensor, the wire configured to break when the dedicated strand breaks, thereby prompting a signal from the wireless sensor to the wireless base station, the wireless base station configured to communicate one of an audible and visual warning to the operator upon receipt of the signal from the wireless sensor.

19. The electronic overload warning system of claim 18, wherein the dedicated strand includes a first eye-loop at a first end and a second eye-loop at a second end.

20. The electronic overload warning system of claim 19, wherein the dedicated strand includes a ring connected to the dedicated strand by the first eye-loop and the second eye-loop, the ring having the load limit less than the rated load of the core strands.

21. The electronic overload warning system of claim 18, wherein the wire is comprised of a twelve-gauge copper wire.

22. An electronic overload warning system for a roundsling having core strands and a cover, the system comprising:
- a wireless sensor system mountable to the roundsling;
- a wireless base station including at least one wireless receiver configured to wirelessly communicate with the wireless sensor systems;
- a dedicated strand mounted proximate the core strands, the dedicated strand having a load limit less than a rated load of the core strands, the dedicated strand has a dedicated strand rated load and the core strands have a core strand rated load, the core strand rated load being greater than the dedicated strand rated load; and
- a wire connected to the dedicated strand and being in communication with the wireless sensor, the wire configured to break when the dedicated strand breaks, thereby prompting a signal from the wireless sensor to the wireless base station, the wireless base station configured to communicate one of an audible and visual warning to the operator upon receipt of the signal from the wireless sensor.

* * * * *

UNITED STATES PATENT AND TRADEMARK OFFICE
CERTIFICATE OF CORRECTION

PATENT NO.        : 9,589,444 B1
APPLICATION NO.   : 15/208271
DATED             : March 7, 2017
INVENTOR(S)       : Scott St. Germain et al.

Page 1 of 1

It is certified that error appears in the above-identified patent and that said Letters Patent is hereby corrected as shown below:

On the Title Page

\*\* (72) Inventor's name is spelled incorrectly.
The correct spelling of Inventor, Uckun's first name is Serdar \*\*

Signed and Sealed this
Seventeenth Day of April, 2018

Andrei Iancu
*Director of the United States Patent and Trademark Office*